P. DEATS.
GRAPE POMACE HEATER.
APPLICATION FILED AUG. 5, 1910.
991,487.
Patented May 9, 1911.
2 SHEETS—SHEET 1.
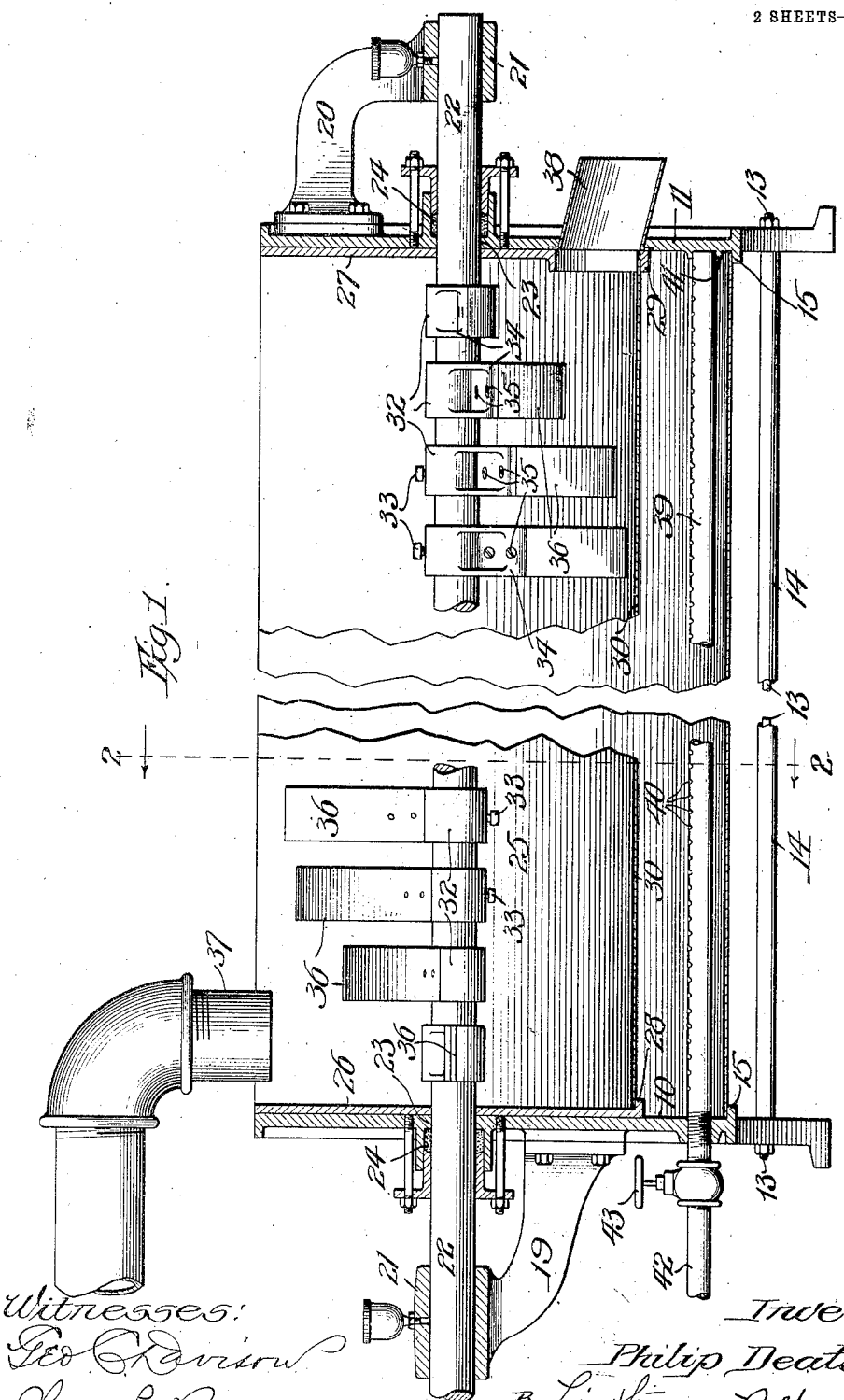

P. DEATS.
GRAPE POMACE HEATER.
APPLICATION FILED AUG. 5, 1910.
991,487.
Patented May 9, 1911.
2 SHEETS—SHEET 2.
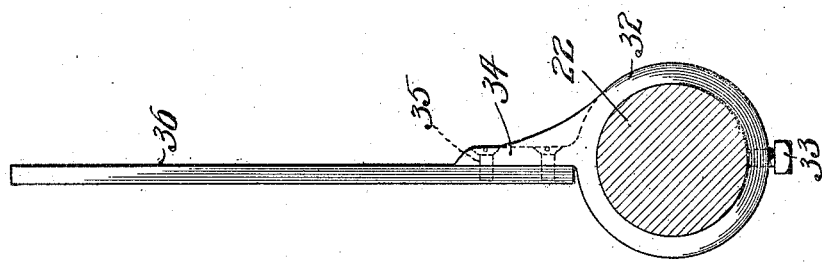
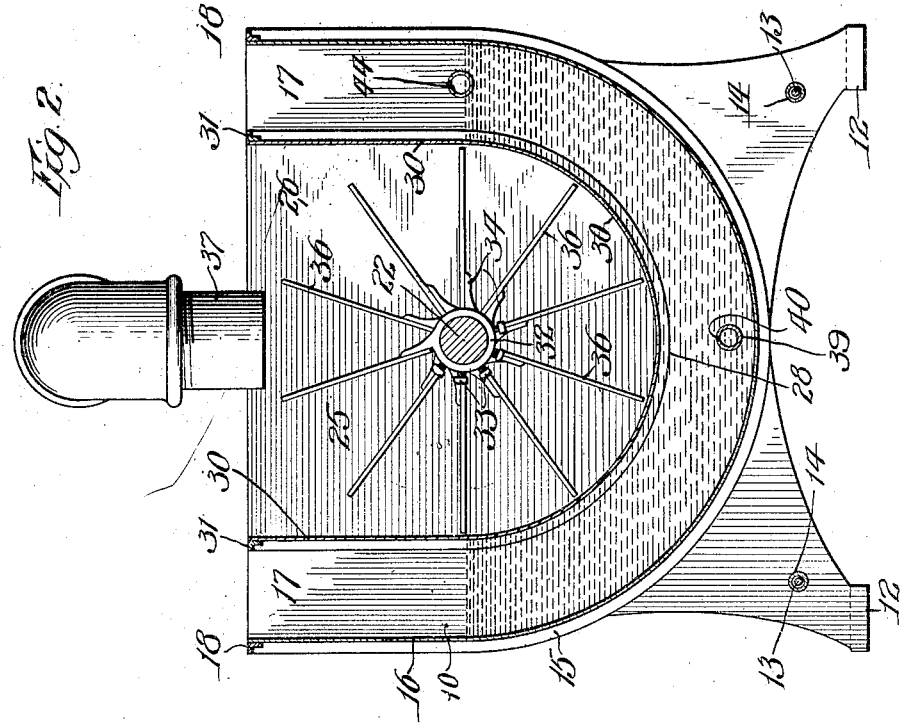

UNITED STATES PATENT OFFICE.

PHILIP DEATS, OF MATTAWAN, MICHIGAN, ASSIGNOR TO ARMOUR & COMPANY, OF CHICAGO, ILLINOIS, A CORPORATION OF ILLINOIS.

GRAPE-POMACE HEATER.

991,487.  Specification of Letters Patent.  Patented May 9, 1911.

Application filed August 5, 1910. Serial No. 575,844.

*To all whom it may concern:*

Be it known that I, PHILIP DEATS, a citizen of the United States, residing at Mattawan, in the county of Van Buren and State of Michigan, have invented certain new and useful Improvements in Grape-Pomace Heaters, of which the following is a specification.

My invention relates to devices for heating grape pomace preliminary to the preparation of bottled grape juice, but it will be appreciated by those skilled in the art that the employment of a heater of this kind is not necessarily limited and restricted to this particular use.

In the commercial production of grape juice it is customary to heat the grape pomace before pressing for the extraction of the juice, for the purpose of developing the flavor and securing the proper color. In carrying out this heating method it is, of course, desirable to use some sort of a vessel not readily corrodible, and it is essential that the pomace shall not be overheated, and, shall travel through the device continuously, so that the heating operation is uninterrupted.

To accomplish these and other results I have invented the improvements hereinafter described in detail in connection with a preferred embodiment of the invention illustrated in the accompanying drawings forming a part of this specification, and throughout the various views of which like reference characters refer to the same parts.

In these drawings,—Figure 1 is a central longitudinal, fragmentary, vertical section through one of the embodiments of the invention; Fig. 2 is a cross section on line 2—2 of Fig. 1, the parts being viewed in the direction indicated by the arrows, and Fig. 3 is a section through the shaft, illustrating the manner of attaching the stirring blades thereto.

By referring to the drawings, it will be apparent that the machine or appliance is supplied with a pair of end castings 10 and 11, preferably made of cast-iron, and each provided with a pair of supporting feet 12, 12, the two castings at their lower portions being connected together and spaced apart the proper distance by the pair of rods or bolts 13, 13, and the spacing pipe sections or sleeves 14 surrounding the rods or bolts between the end castings. Each end casting has on its inner surface an inwardly extended marginal flange 15 of curved form, which is adapted to support a thin metal sheet 16 forming the outer wall of a hot-water jacket or compartment 17 of substantially U-shaped form in cross section, as shown in Fig. 2. Along each of its upper edges, the plate 16 has fastened thereto a small stiffening angle bar 18 for the obvious purpose of strengthening the edge of the plate.

Each end casting has bolted to its outer face a bracket 19 and 20, each supplied with a bearing 21, such bearings accommodating a revoluble shaft 22 which extends through the casing of the machine, through alined holes 23 in the two end members of the machine, each of the latter being equipped with a stuffing box 24 surrounding the shaft just outside of the casing.

The appliance has an inner or pomace compartment 25 composed of two aluminum end plates 26 and 27 disposed just inside of the end members 10 and 11 and having around their curved peripheries, inwardly-extended flanges 28 and 29 which support and confine a thin, curved aluminum plate 30 forming the bottom and side walls of the compartment 25 and having along its top edges the stiffening angle bars 31, 31. The shaft 22 has adjustably fixed thereto in the chamber 25 a plurality of sleeves or collars 32 adapted to be held in adjusted position on the shaft by set screws 33, each collar having an outstanding projection 34 to which is fastened, by screws 35, a stirring or agitating and conveying blade 36, preferably of aluminum. As is clearly indicated in Figs. 1 and 2, these blades are arranged spirally around the shaft for the purpose of making the power necessary to revolve the shaft more uniform, and for the further purpose of gradually advancing the pomace from one end of the chamber to the other. Above one end of the appliance I employ an admission conduit or pipe 37, through which the pomace is fed to the heater, and at the other end of the device I supply the end casting 11 with a discharge spout 38. In devices of this character it is preferable to heat the water of the jacket in compartment 17 by means of steam delivered thereto, and in order to secure a uniform heating of the jacket I use a steam pipe 39 perforated along its entire length within the water chamber at 40, supported at one end at 41 in the end member 11, and having a suitable connection with the external pipe 42 leading to any suitable source of steam and equipped with a control valve 43. Chamber 17 has in addition a water overflow pipe 44, shown in Fig. 2, which determines the height to which the water may rise in the jacket compartment.

It should be clear to those skilled in the art that the pomace chamber 25, being composed of aluminum, is practically non-corrodible when grapes are used, the same remarks applying to the blades 36, although it is not necessary to have the shaft 22 of such material, because it is disposed above the height to which the pomace rises in the chamber.

Assuming that the compartment 25 is heated by the hot water in the jacket 17, the temperature of which can never rise above 212°, because the chamber is open at its top to the atmosphere, the pomace is fed to the compartment 25 through the pipe 37, becomes heated and is caused to travel along the compartment by the stirring blades, finally being discharged through the spout 38, the blades not only effecting the travel of the pomace, but also stirring the same to secure a uniform temperature throughout of the body being treated.

The appliance is readily taken apart for cleaning, that is, for cleaning other than can be readily accomplished without dismantling, by loosening the set screws 33, withdrawing the shaft 22 longitudinally through the bearings and stuffing boxes, which will permit the withdrawal of the aluminum ends 26 and 27 and the sheet of metal 38, as well as the aluminum blades 36. These can then be scoured and cleaned as much as is necessary, and can be readily replaced.

Owing to the fact that the stirring blades 36 are normally adjustable around their supporting shaft 22, the speed of travel of the pomace through the heater can be readily varied, either by changing the positions of these blades or by varying the speed of rotation of the shaft.

I do not wish to be limited to the exact features of construction herein shown and described, because the invention is susceptible of different embodiments and the elements entering into the appliance herein set forth may be modified structurally within comparatively wide limits without departure from the heart and substance of the invention.

I claim:

1. In a grape pomace heater, the combination of a compartment adapted to hold the pomace, an incasing compartment open to the atmosphere and adapted to contain hot water, a perforated pipe in said incasing compartment extended substantially the full length thereof and adapted to discharge steam to the water jacket, means to feed the pomace to one end of said pomace compartment, means to discharge the pomace at the other end of the compartment, and a plurality of stirrers adapted to agitate the contents of the inner compartment, said pomace compartment being made of aluminum and having the end walls thereof removably mounted in the appliance, the stirrers being also removable, substantially as described.

2. In a grape pomace heater, the combination of a compartment adapted to hold the pomace, an incasing compartment open to the atmosphere and adapted to contain hot water, a perforated pipe in said incasing compartment extended substantially the full length thereof and adapted to discharge steam to the water jacket, means to feed the pomace to one end of the pomace compartment, means to discharge the pomace at the other end thereof, a shaft extended through said pomace compartment, and a plurality of stirrers detachably mounted on said shaft, said stirrers being arranged spirally on such shaft, the walls of said pomace compartment being of aluminum and the ends thereof being removably mounted in the appliance, substantially as described.

3. In a grape pomace heater, the combination of a compartment adapted to hold the pomace, an incasing compartment open to the atmosphere and adapted to contain hot water, a perforated pipe in said incasing compartment extended substantially the full length thereof and adapted to discharge steam to the water jacket, means to feed the pomace into one end of said pomace compartment, means to discharge the pomace at the other end of the compartment, a shaft extended through said pomace compartment, a plurality of collars angularly adjustable on said shaft, and a plurality of stirring blades secured to said collars, said blades being arranged spirally around said shaft, the walls of said pomace compartment being made of aluminum and the ends thereof being removably mounted in the appliance, substantially as described.

PHILIP DEATS.

Witnesses:
WM. KILLEFER,
H. H. HOWARD.